United States Patent
Zhao et al.

(10) Patent No.: US 11,875,622 B2
(45) Date of Patent: Jan. 16, 2024

(54) AUTHENTICATION METHOD AND USER EQUIPMENT

(71) Applicant: Beijing Xiaomi Mobile Software Co., Ltd., Beijing (CN)

(72) Inventors: Jiankai Zhao, Beijing (CN); Xiaohui Liu, Beijing (CN); Panpan Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/572,058

(22) Filed: Jan. 10, 2022

(65) Prior Publication Data

US 2022/0130194 A1 Apr. 28, 2022

Related U.S. Application Data

(63) Continuation of application No. 16/989,298, filed on Aug. 10, 2020, now Pat. No. 11,263,846.

(30) Foreign Application Priority Data

Mar. 25, 2020 (CN) .......................... 202010217934.6

(51) Int. Cl.
*G06Q 50/12* (2012.01)
*G07C 9/00* (2020.01)
(Continued)

(52) U.S. Cl.
CPC ......... *G07C 9/00571* (2013.01); *G06Q 50/12* (2013.01); *G06V 40/166* (2022.01);
(Continued)

(58) Field of Classification Search
CPC ..... H04W 4/80; G06Q 50/12; G07C 9/00904; G07C 2009/00865; G07C 9/00857; G06K 9/00268
See application file for complete search history.

(56) References Cited

U.S. PATENT DOCUMENTS

| 11,263,846 B2 * | 3/2022 | Zhao ................... G06V 40/172 |
| 2011/0187493 A1 * | 8/2011 | Elfstrom ............ G07C 9/00309 340/5.6 |

(Continued)

FOREIGN PATENT DOCUMENTS

| CN | 104376621 A | 2/2015 |
| CN | 104680341 A | 6/2015 |

(Continued)

OTHER PUBLICATIONS

First Office Action of U.S. Appl. No. 16/989,298, dated May 11, 2021.

(Continued)

*Primary Examiner* — Vernal U Brown
(74) *Attorney, Agent, or Firm* — Finnegan, Henderson, Farabow, Garrett & Dunner, L.L.P

(57) ABSTRACT

An authentication method used in a server, includes: acquiring check-in information sent by user equipment (UE) of a user, wherein the check-in information includes information on the user and a check-in period; determining information on a room of the user based on the check-in information; sending the information on the room to the UE; determining unlocking information based on the check-in information; and sending the unlocking information to at least one of the UE or door lock equipment corresponding to the information on the room, wherein the door lock equipment is configured to authenticate the user based on the unlocking information during the check-in period, the unlocking information being invalid other than during the check-in period.

6 Claims, 12 Drawing Sheets

(51) Int. Cl.
*H04W 4/80* (2018.01)
*G06V 40/16* (2022.01)

(52) U.S. Cl.
CPC .......... *G06V 40/168* (2022.01); *G06V 40/172* (2022.01); *G07C 9/00904* (2013.01); *H04W 4/80* (2018.02)

(56) References Cited

U.S. PATENT DOCUMENTS

| | | |
|---|---|---|
| 2013/0229259 A1 | 9/2013 | Huang |
| 2014/0145823 A1 | 5/2014 | Aase |
| 2016/0321633 A1* | 11/2016 | Chandrasekaran .... G06Q 20/20 |
| 2017/0161978 A1 | 6/2017 | Wishne |
| 2017/0280147 A1 | 9/2017 | Yu et al. |
| 2017/0289147 A1 | 10/2017 | Kylloonen |
| 2019/0279448 A1 | 9/2019 | Kwon et al. |
| 2021/0125111 A1* | 4/2021 | Simon .................... G06Q 50/12 |

FOREIGN PATENT DOCUMENTS

| | | |
|---|---|---|
| CN | 105788042 A | 7/2016 |
| CN | 105913532 A | 8/2016 |
| CN | 107229985 A | 10/2017 |
| CN | 107682339 A | 2/2018 |
| CN | 108320352 A | 7/2018 |
| CN | 108628218 A | 10/2018 |
| CN | 110675543 A | 1/2020 |
| DE | 102015118627 A1 | 5/2017 |
| EP | 2 736 021 A2 | 5/2014 |
| WO | WO 2017075952 A1 | 5/2017 |

OTHER PUBLICATIONS

European Search Report in the European Application No. 20192750.6, dated Jan. 28, 2021.
First Office Action dated Jun. 28, 2021, from The State Intellectual Property Office of People's Republic of China in counterpart Chinese Application No. 202010217934.6.

* cited by examiner

AUTHENTICATION METHOD AND USER EQUIPMENT

CROSS-REFERENCE TO RELATED APPLICATIONS

This application is a continuation application of U.S. application Ser. No. 16/989,298, filed on Aug. 10, 2020, which is based on and claims priority to Chinese Patent Application No. 202010217934.6 filed on Mar. 25, 2020, the entire contents of both of which are hereby incorporated by reference.

BACKGROUND

Conventionally, a guest arriving at a hotel may need to check in at the hotel reception before the guest may get a room card to access an individual room. The guest may need to check out at the hotel reception and return the room card, and wait until a hotel staff member confirms the guest is good to go. The whole process involves both the hotel staff member and the guest and may take a long time. The guest may run late due to a queue during rush hour. There may be a risk such as that the room card is lost, damaged, left in the room, etc. Although biometrics, such as facial characteristics, fingerprint characteristics, etc., instead of a room card, have been used in some hotels to unlock a door of a room, biometrics may be used only after check-in at the hotel reception.

SUMMARY

According to a first aspect of embodiments of the present disclosure, an authentication method used in a server, includes: acquiring check-in information sent by user equipment (UE) of a user, wherein the check-in information includes information on the user and a check-in period; determining information on a room of the user based on the check-in information; sending the information on the room to the UE; determining unlocking information based on the check-in information; and sending the unlocking information to at least one of the UE or door lock equipment corresponding to the information on the room. The door lock equipment is configured to authenticate the user based on the unlocking information during the check-in period. The unlocking information is invalid other than during the check-in period.

According to a second aspect of embodiments of the present disclosure, an authentication method, used in user equipment (UE), includes: sending, to a server, check-in information of a user of the UE, wherein the check-in information includes information on the user and a check-in period; receiving information on a room of the user, wherein the information on the room is determined by the server based on the check-in information; receiving unlocking information, wherein the unlocking information is determined by the server based on the check-in information and is near field communication (NFC) information; and accepting authentication by door lock equipment corresponding to the information on the room based on the NFC information during the check-in period, or sending, based on the NFC information during the check-in period, authentication information to the door lock equipment corresponding to the information on the room. The door lock equipment is configured to authenticate the user using the authentication information.

According to a third aspect of embodiments of the present disclosure, user equipment includes: a processor; and a memory storing an instruction executable by the processor, wherein the processor is configured to perform the authentication method according to the second aspect.

The above general description and detailed description below are exemplary and explanatory, and do not limit the present disclosure.

BRIEF DESCRIPTION OF THE ACCOMPANYING DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The embodiments set forth in the following description of exemplary embodiments do not represent all embodiments consistent with the present disclosure. Instead, they are merely examples of apparatuses and methods consistent with aspects related to the present disclosure as recited in the appended claims.

In some embodiments, near field communication (NFC) may be supported by an application of a mobile phone. After a user gets a room card at a hotel, the room card may be simulated by the mobile phone. Then, a door may be unlocked using the mobile phone. However, the room card of the hotel may be encrypted and may not be simulated automatically using NFC. Furthermore, it still requires manual participation of both hotel staff and the guest and may take a long time. The guest may run late due to a queue during rush hour. In addition, a physical room card is still required as well, and there may be a risk such as that the room card is lost, damaged, etc.

In some embodiments, a door of a room at a hotel may be unlocked through face identification or fingerprint identification. A guest may enter face or fingerprint information when checking in at the hotel reception. Then, the guest may unlock the door and enter the room using a camera or a fingerprint lock at the door. This process requires additional entry of face or fingerprint information at check-in and, thus, participation of both hotel staff and the guest, which may take a long time.

In view of the above, embodiments of the present disclosure provide an authentication method for a server of a hotel, an authentication method for user equipment (UE) of a guest checking into the hotel, and an authentication method for door lock equipment of the hotel.

Figure 1:
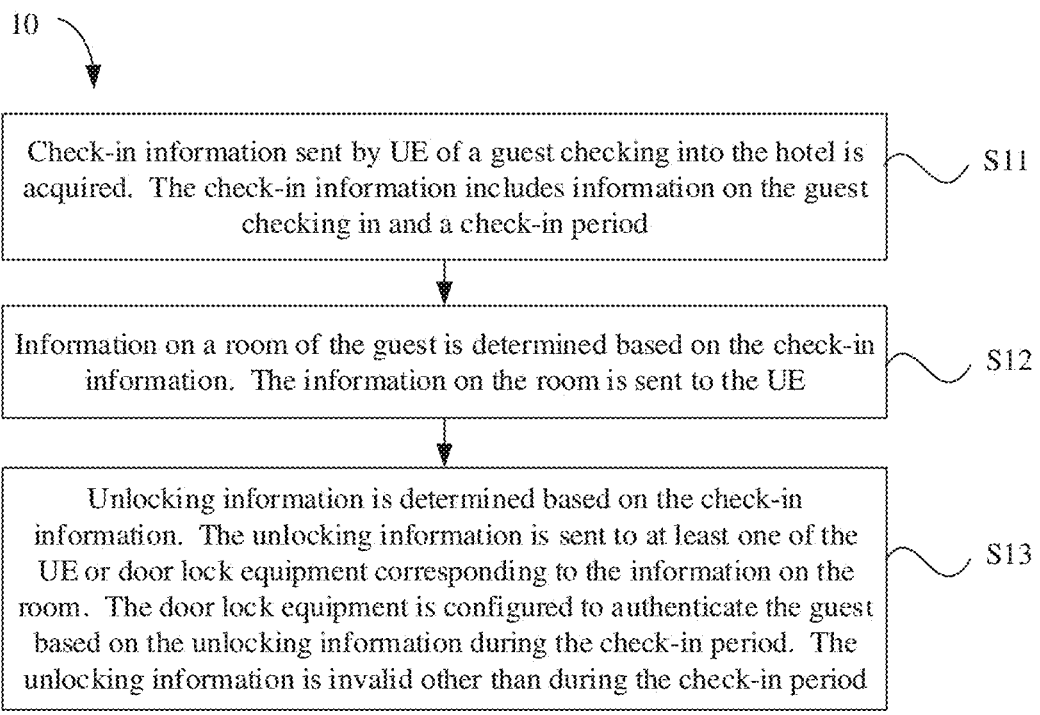
FIG. 1 is a flowchart of an authentication method according to an exemplary embodiment.

FIG. 1 is a flowchart of an authentication method 10, according to an exemplary embodiment. The authentication method 10 may be used in a server of a hotel. The server may communicate, through a web page or an application, with UE of a user, e.g., a guest who is to check into the hotel. The server may also communicate, through a local network of the hotel, etc., with door lock equipment of a room of the hotel. As shown in FIG. 1, the authentication method 10 includes the following steps.

In S11, check-in information sent by UE of a guest checking into the hotel is acquired. The check-in information includes information on the guest checking in and a check-in period.

In an embodiment, the guest may book the hotel using a web page or an application in the UE. The server of the hotel may acquire check-in information of the guest. Check-in information may include at least information on the guest, such as a name, an ID number, etc. Check-in information may further include a check-in period, such as a check-in time and a check-out time.

In S12, information on a room of the guest is determined based on the check-in information. The information on the room is sent to the UE.

In an embodiment, the check-in information is acquired, and then, the information on the room of the guest may be determined. For example, any available room may be displayed according to a filter condition such as a number of guests checking in, check-in periods, etc. The information on the room of the guest may be determined by letting the guest select the room. Also for example, the information on the room of the guest may be determined by a hotel according to a number of guests checking in, check-in periods, etc. After the information on the room of the guest is determined, the information on the room may be sent to the UE of the guest. Accordingly, the guest may conveniently learn the room to check in. The information on the room may include a room number of the room, a location of the room, etc.

In S13, unlocking information is determined based on the check-in information. The unlocking information is sent to at least one of the UE or door lock equipment corresponding to the information on the room. The door lock equipment is configured to authenticate the guest based on the unlocking information during the check-in period. The unlocking information may be invalid other than during the check-in period.

In an embodiment, once check-in information is determined, to allow a guest to enter a booked room conveniently without having to go through service at the reception upon check-in, unlocking information may be sent to at least one of UE of the guest or door lock equipment of the booked room. Accordingly, during a check-in period, the guest may be authenticated by the door lock equipment and enter a room. Therefore, a labor cost and a waiting time may be reduced greatly, improving efficiency, and a guest may check into a hotel safely and quickly.

Figure 2:
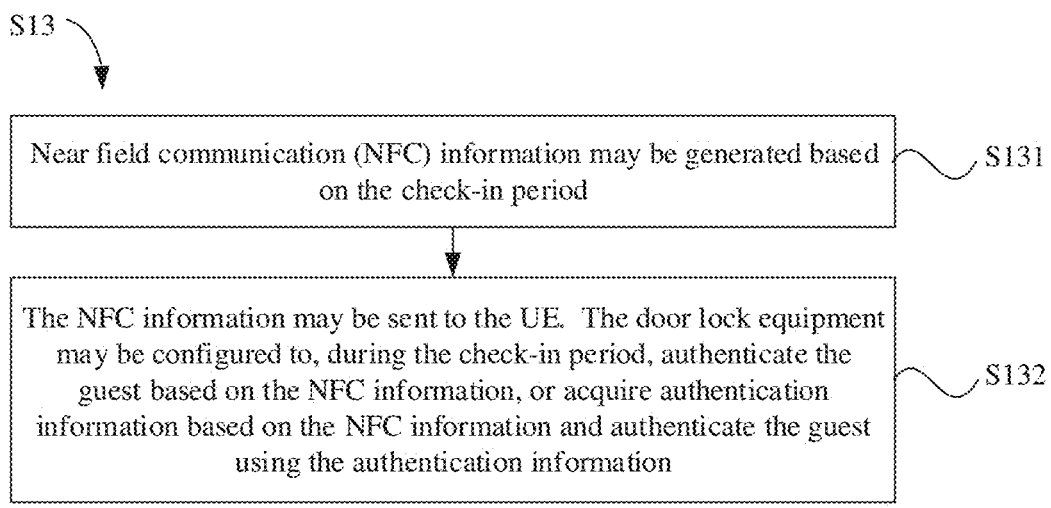
FIG. 2 is a flowchart of an authentication method according to an exemplary embodiment.

FIG. 2 is a flowchart of an authentication method according to an exemplary embodiment. Referring to FIG. 2, S13 (FIG. 1) may include the following steps.

In S131, near field communication (NFC) information may be generated based on the check-in period. In S132, the NFC information may be sent to the UE. The door lock equipment may be configured to, during the check-in period, authenticate the guest based on the NFC information, or acquire authentication information based on the NFC information, and authenticate the guest using the authentication information. In an embodiment, data exchange and authentication may be performed via NFC. The server of the hotel may generate NFC information with a valid period. After receiving the NFC information, the UE of the guest may simulate a virtual card. The door lock equipment may authenticate the guest by authenticating the virtual card. The valid period may expire upon expiration of the check-in period. A result of authentication by the door lock equipment may show that the virtual card is invalid and, thus, not unlock the door. In an embodiment, the server of the hotel may generate NFC information configured to interact with door lock equipment. The UE of the guest may send authentication information stored in the UE to the door lock equipment by exchanging data with the door lock equipment via NFC based on the NFC information. The authentication information may be configured to authenticate the guest. The authentication information may be biometrics such as facial characteristics, fingerprint characteristics, iris characteristics, voiceprint characteristics, etc. The door lock equipment may authenticate the guest by collecting the relevant characteristics of the guest in real time and comparing/matching the relevant characteristics to authentication information. With the NFC technology, the guest may be authenticated conveniently without having to go through the traditional check-in procedure, which also improves safety.

Figure 3:
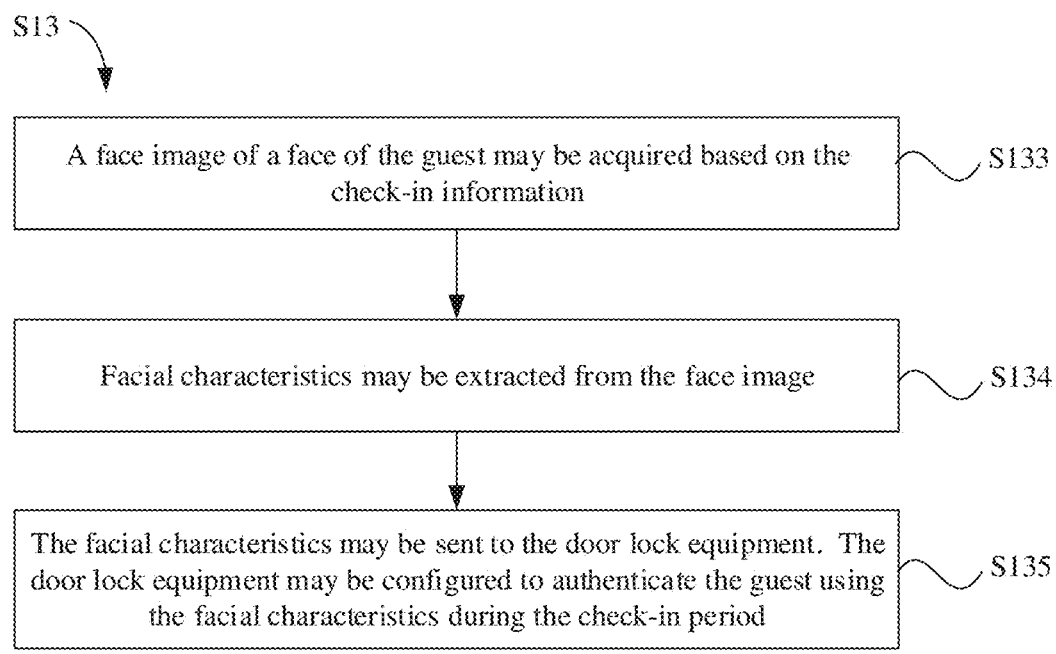
FIG. 3 is a flowchart of an authentication method according to an exemplary embodiment.

FIG. 3 is a flowchart of art authentication method according to an exemplary embodiment. Referring to FIG. 3, S13 (FIG. 1) may further include the following steps.

In S133, a face image of a face of the guest may be acquired based on the check-in information. In S134, facial characteristics may be extracted from the face image. In S135, the facial characteristics may be sent to the door lock equipment. The door lock equipment may be configured to authenticate the guest using the facial characteristics during the check-in period. In an embodiment, the server of the hotel may acquire the face image of the face of the guest based on check-in information. For example, the face image may be collected in real time using the UE of the guest, and then sent to the server. Alternatively, the face image may be acquired using a photo in an ID card of the guest. Facial characteristics may be extracted from the face image using a neural network model, etc. The facial characteristics may then be sent to the door lock equipment. When the guest is to enter a room, the door lock equipment may collect the face image of the face of the guest in real time. The door lock equipment may authenticate the guest by comparing facial characteristics. The door lock equipment may delete stored facial characteristics upon expiration of a check-in period. Alternatively, the server of the hotel may send an invalidation instruction to the door lock equipment. Accordingly, the door lock equipment may delete facial characteristics. Thereby, hotel check-in is managed conveniently while securing privacy of the guest. In an embodiment, facial characteristics may be saved in the server of the hotel. The door lock equipment may collect a face image of the face of the guest. The door lock equipment may send the face image to the server. The server may extract facial characteristics from the face image and compare the extracted facial characteristics with stored facial characteristics. The server may send a result of comparison, an unlocking instruction, a locking instruction, etc., to the door lock equipment to authenticate the guest.

Figure 4:
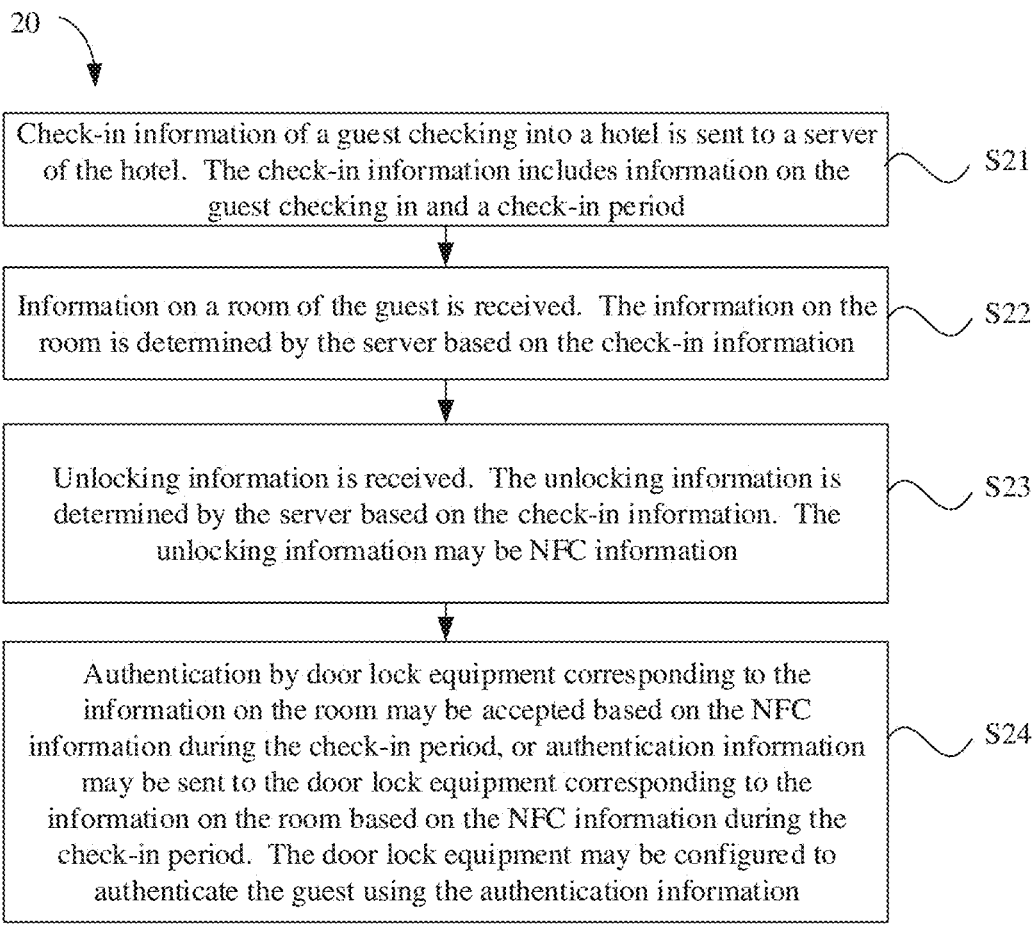
FIG. 4 is a flowchart of an authentication method according to an exemplary embodiment.

FIG. 4 is a flowchart of an authentication method 20, according to an exemplary embodiment. The authentication method 20 may be used in UE. The UE may be a mobile phone, a tablet computer, etc. The UE may communicate, through a web page or an application, with a server of a hotel. The UE may be provided with an NFC module. The UE may exchange data with, or authenticate, equipment via NFC. As shown in FIG. 4, the authentication method 20 includes the following steps.

In S21, check-in information of a guest checking into a hotel is sent to a server of the hotel. The check-in information includes information on the guest checking in and a check-in period.

In an embodiment, the guest may book a room through a web page or an application. Information on identity of the guest, an expected check-in time, an expected check-out time, etc., may be sent to the server of the hotel.

In S22, information on a room of the guest is received. The information on the room is determined by the server based on the check-in information.

In an embodiment, after determining a room, the server of the hotel may send information on the room such as a room number to the UE. In an embodiment, the user may acquire information on a room by selecting the room.

In S23, unlocking information is received. The unlocking information is determined by the server based on the check-in information. The unlocking information may be NFC information.

In an embodiment, the server of the hotel may generate NFC information based on check-in information. The server of the hotel may send the NFC information to the UE. The UE may exchange data or be authenticated straightforwardly via NFC.

In S24, authentication by door lock equipment corresponding to the information on the room may be accepted based on the NFC information during the check-in period, or authentication information may be sent to the door lock equipment corresponding to the information on the room based on the NFC information during the check-in period. The door lock equipment may be configured to authenticate the guest using the authentication information.

In an embodiment, the UE may generate a virtual card based on NFC information. The door lock equipment may read the virtual card at a close range via NFC, thereby authenticating the guest and performing an operation accordingly, such as unlocking a door, etc. Moreover, the NFC information may include expiration information. After a check-in period expires, the NFC information and the virtual card generated may be invalidated automatically.

In an embodiment, the UE may send the NFC information to a wearable device. The wearable device may be configured to accept authentication by the door lock equipment based on the NFC information. The wearable device may be a wristband, a watch, etc., with an NFC module. The wearable device may generate a virtual card using the NFC information. The door lock equipment may authenticate a guest by authenticating the virtual card.

In an embodiment, the UE may send authentication information to the door lock equipment by exchanging data with the door lock equipment, which may also be provided with an NFC module, based on the NFC information. Authentication information may include biometrics such as facial characteristics, fingerprint characteristics, iris characteristics, voiceprint characteristics, etc. When the guest is to unlock a door, the door lock equipment may authenticate the guest by collecting, in real time, an image of the guest corresponding to the biometrics and comparing the characteristics.

With the authentication method herein, the guest spends less time checking in, and checks in and out safely and efficiently.

Figure 5:
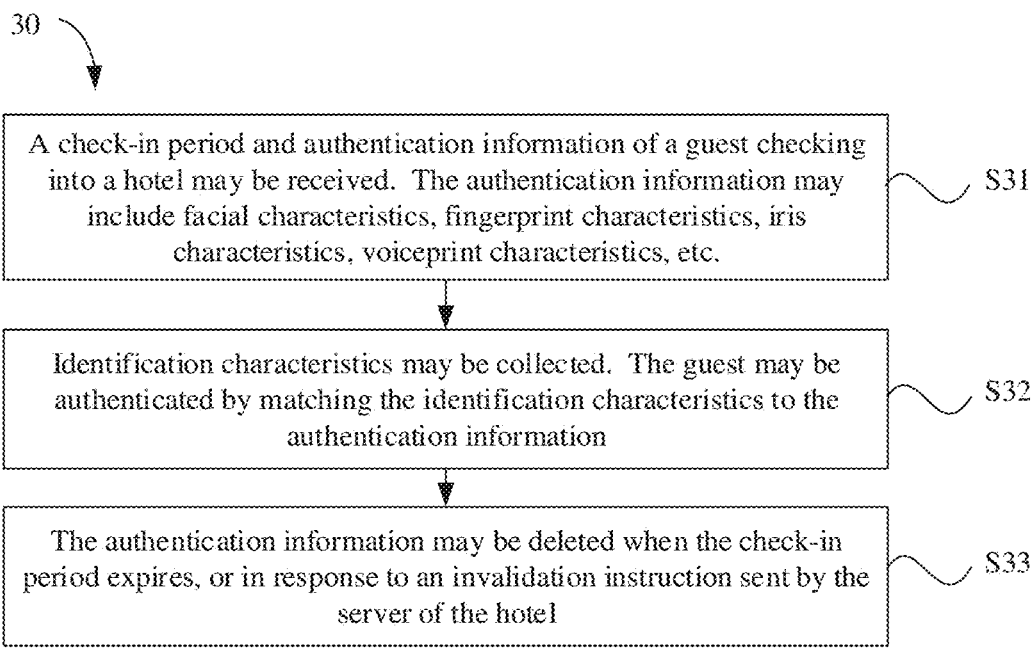
FIG. 5 is a flowchart of an authentication method according to an exemplary embodiment.

FIG. 5 is a flowchart of an authentication method 30, according to an exemplary embodiment. The authentication method 30 may be used in door lock equipment of a hotel. The door lock equipment may be a smart door lock of the hotel. The door lock equipment may be connected to and communicate with a server of the hotel. The door lock equipment may be provided with a module for collecting biometrics, such as a module for collecting an image, a fingerprint, etc. The door lock equipment may be provided with an NFC module for data exchange or authentication. By performing authentication, the door lock equipment may unlock a door or keep the door locked. As shown in FIG. 5, the authentication method 30 includes the following steps.

In S31, a check-in period and authentication information of a guest checking into a hotel may be received. The authentication information may include facial characteristics, fingerprint characteristics, iris characteristics, voiceprint characteristics, etc.

In an embodiment, the door lock equipment may receive a check-in period and authentication information sent by a server of the hotel. Both the check-in period and the authentication information may be acquired by the server based on check-in information of the guest. The server may acquire the authentication information of the guest and send the authentication information to the door lock equipment. The door lock equipment may authenticate the guest based on the authentication information. Moreover, the check-in period may secure a time period during which the authentication information is applicable. The authentication information may be invalidated and deleted automatically upon expiration of the check-in period.

In an embodiment, the door lock equipment may receive a check-in period and authentication information sent by UE of the guest using NFC information of the UE based on NFC. The NFC information may be determined by the server of the hotel based on check-in information of the guest, and sent to the UE. The door lock equipment may authenticate the guest based on the authentication information.

In S32, identification characteristics may be collected. The guest may be authenticated by matching the identification characteristics to the authentication information.

In an embodiment, information corresponding to authentication information may be collected. For example, the authentication information may be facial characteristics based on a collected face image. The authentication information may be fingerprint information based on a collected fingerprint. The authentication information may be voiceprint information based on a collected voice. Characteristics may be extracted from collected information and matched with the authentication information. If they match, the guest may be authenticated successfully, and an operation such as unlocking may be performed. Otherwise, a locked state may remain.

In S33, the authentication information may be deleted when the check-in period expires, or in response to an invalidation instruction sent by the server of the hotel.

In an embodiment, to secure information and manage check-ins, authentication information may be deleted automatically when a check-in period expires. Alternatively, after the server of the hotel has sent an invalidation instruction to the door lock equipment, the door lock equipment may delete the authentication information saved thereon. After the authentication information has been deleted, the guest may not be authenticated successfully by comparing identification characteristics to the authentication information.

In an embodiment, the door lock equipment may collect, using a module for collecting biometrics, biometrics of the guest such as a face image, a fingerprint image, an iris image, a voice, etc. The door lock equipment may send the collected biometrics to the server of the hotel. The server may extract and compare characteristics. The server may send a result of the comparison to the door lock equipment. Alternatively, the server may send, to the door lock equipment, an unlocking instruction or a locking instruction generated based on the result of the comparison.

In an embodiment, the door lock equipment may be provided with an NFC module configured to authenticate a swipe card or a virtual card. The guest may acquire NFC information from the server of the hotel, etc. A virtual card may be generated. Upon detecting the virtual card, the door lock equipment may authenticate the identity and perform an unlock operation such as to unlock a door. Meanwhile, the swipe card or the virtual card may have expiration information. When a check-in period of the guest expires, authentication of the guest by the door lock equipment may fail.

With the authentication method 10, the authentication method 20, or the authentication method 30, a hotel may be managed more efficiently. A guest may check into a hotel more efficiently. A guest may check in and check out conveniently and safely.

Figure 6:
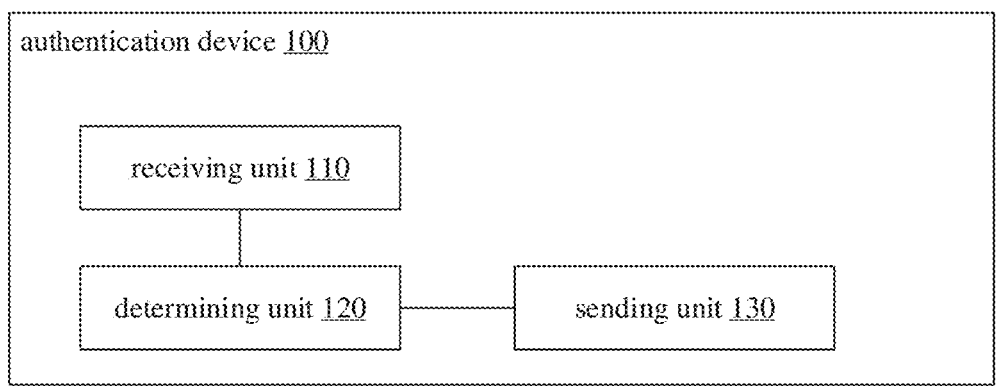
FIG. 6 is a block diagram of an authentication device according to an exemplary embodiment.

FIG. 6 is a block diagram of an authentication device 100, according to an exemplary embodiment. The authentication device 100 may be used in a server of a hotel. The authentication device 100 includes a receiving unit 110, a determining unit 120, and a sending unit 130. The receiving unit 110 is configured to acquire check-in information sent by UE of a guest checking into the hotel. The check-in information includes information on the guest checking in and a check-in period. The determining unit 120 is configured to determine information on a room of the guest based on the check-in information. The sending unit 130 is configured to send the information on the room to the UE. The determining unit 120 is configured to determine unlocking information based on the check-in information. The sending unit 130 is configured to send the unlocking information to at least one of the UE or door lock equipment corresponding to the information on the room. The door lock equipment is configured to authenticate the guest based on the unlocking information during the check-in period. The unlocking information may be invalid other than during the check-in period.

In an embodiment, the determining unit 120 may be configured to generate NFC information based on the check-in period. The sending unit 130 may be configured to send the NFC information to the UE. The door lock equipment may be configured to, during the check-in period, authenticate the guest based on the NFC information, or acquire authentication information based on the NFC information and authenticate the guest using the authentication information.

In an embodiment, the authentication information may include facial characteristics, fingerprint characteristics, iris characteristics, voiceprint characteristics, etc.

Figure 7:
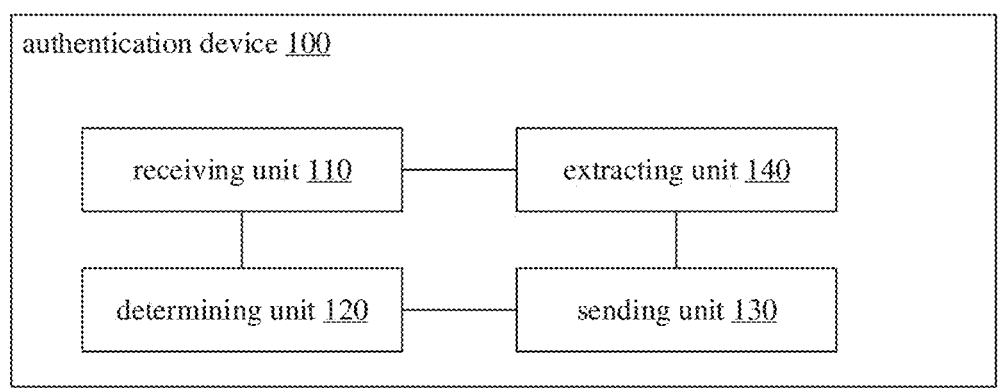
FIG. 7 is a block diagram of an authentication device according to an exemplary embodiment.

In an embodiment, as shown in FIG. 7, the determining unit 120 may be configured to acquire a face image of a face of the guest based on the check-in information. The authentication device 100 may further include an extracting unit 140 configured to extract facial characteristics from the face image. The sending unit 130 may be configured to send the facial characteristics to the door lock equipment. The door lock equipment may be configured to authenticate the guest using the facial characteristics during the check-in period.

In an embodiment, the sending unit 130 may be configured to, in response to determining that the check-in period expires, or in response to an invalidation instruction, send invalidation information to the door lock equipment. The door lock equipment is configured to delete the unlocking information.

For detailed operations of the units in the authentication device 100, reference may be made to the authentication method 10 (FIGS. 1-3), which will not be repeated here.

Figure 8:
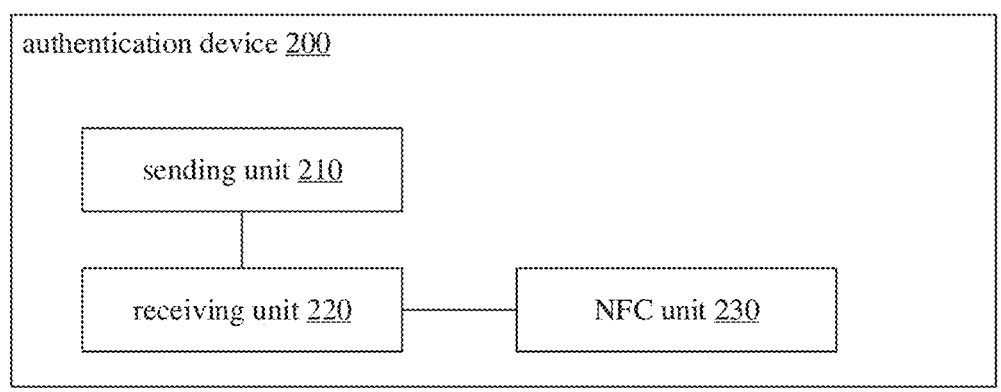
FIG. 8 is a block diagram of an authentication device according to an exemplary embodiment.

FIG. 8 is a block diagram of an authentication device 200, according to an exemplary embodiment. The authentication device 200 may be used in UE. The authentication device 200 includes a sending unit 210, a receiving unit 220, and a Near Field Communication (NFC) unit 230. The sending unit 210 is configured to send, to a server of a hotel, check-in information of a guest checking into the hotel. The check-in information includes information on the guest checking in and a check-in period. The receiving unit 220 is configured to receive information on a room of the guest. The information on the room is determined by the server based on the check-in information. The receiving unit 220 is configured to receive unlocking information. The unlocking information is determined by the server based on the check-in information. The unlocking information is NFC information. The NFC unit 230 is configured to accept authentication by door lock equipment corresponding to the information on the room based on the NFC information during the check-in period. Alternatively, the NFC unit 230 is configured to send, based on the NFC information during the check-in period, authentication information to the door lock equipment corresponding to the information on the room. The door lock equipment is configured to authenticate the guest using the authentication information.

In an embodiment, the authentication information may include facial characteristics, fingerprint characteristics, iris characteristics, voiceprint characteristics, etc.

In an embodiment, the NFC information may be invalid other than during the check-in period.

In an embodiment, the sending unit 210 may be configured to send the NFC information to a wearable device. The wearable device may be configured to accept authentication by the door lock equipment based on the NFC information.

For detailed operations of the units in the authentication device 200, reference may be made to the authentication method 20 (FIG. 4), which will not be repeated here.

Figure 9:
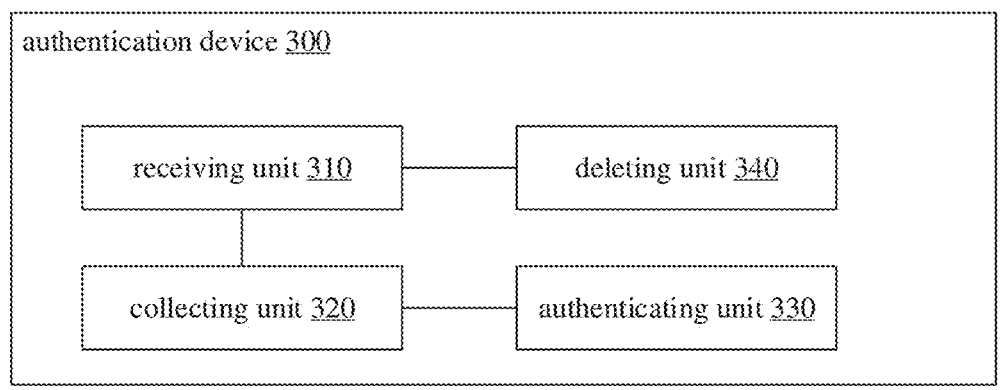
FIG. 9 is a block diagram of an authentication device according to an exemplary embodiment.

FIG. 9 is a block of an authentication device 300, according to an exemplary embodiment. The authentication device 300 may be used in door lock equipment. The authentication device 300 includes a receiving unit 310, a collecting unit 320, an authenticating unit 330, and a deleting unit 340. The receiving unit 310 is configured to receive a check-in period and authentication information of a guest checking into a hotel. The authentication information may include facial characteristics, fingerprint characteristics, iris characteristics, voiceprint characteristics, etc. The collecting unit 320 is configured to collect identification characteristics. The authenticating unit 330 is configured to authenticate the guest by matching the identification characteristics to the authentication information. The deleting unit 340 is configured to delete the authentication information in response to determining that the check-in period expires. Alternatively, the deleting unit 340 is configured to delete the authentication information in response to an invalidation instruction sent by a server of the hotel.

In an embodiment, the receiving unit 310 may be configured to receive the check-in period and the authentication information sent by the server. Both the check-in period and the authentication information may be acquired by the server based on check-in information of the guest.

Figure 10:
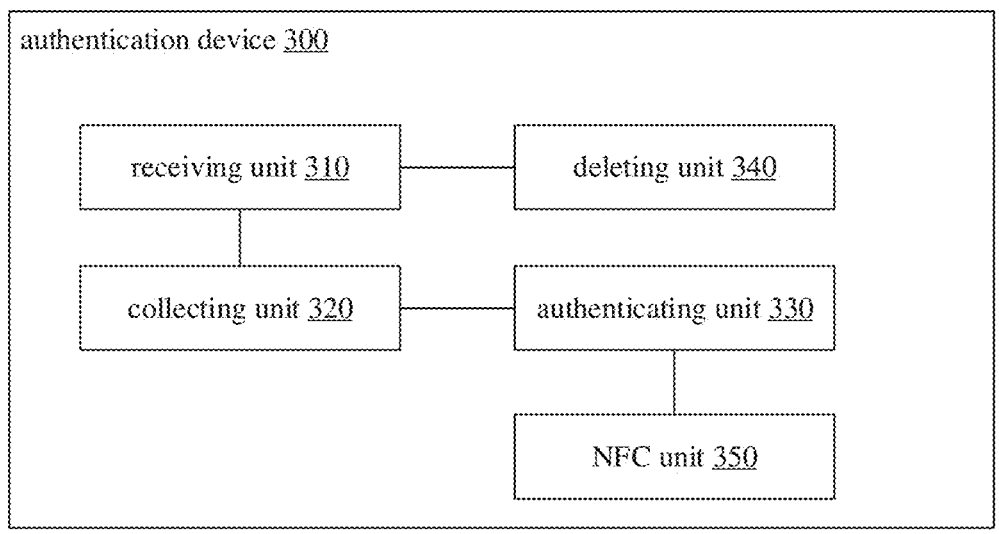
FIG. 10 is a block diagram of an authentication device according to an exemplary embodiment.

In an embodiment, as shown in FIG. 10, the authentication device 300 may further include a Near Field Communication (NFC) unit 350. The NFC unit 350 may be configured to receive, based on NFC information, the check-in period and the authentication information sent by the of the guest. The NFC information may be determined by the server based on check-in information of the guest, and sent to the UE.

For detailed operations of the units in the authentication device 300, reference may be made to the authentication method 30 (FIG. 5), which will not be repeated here.

Figure 11:
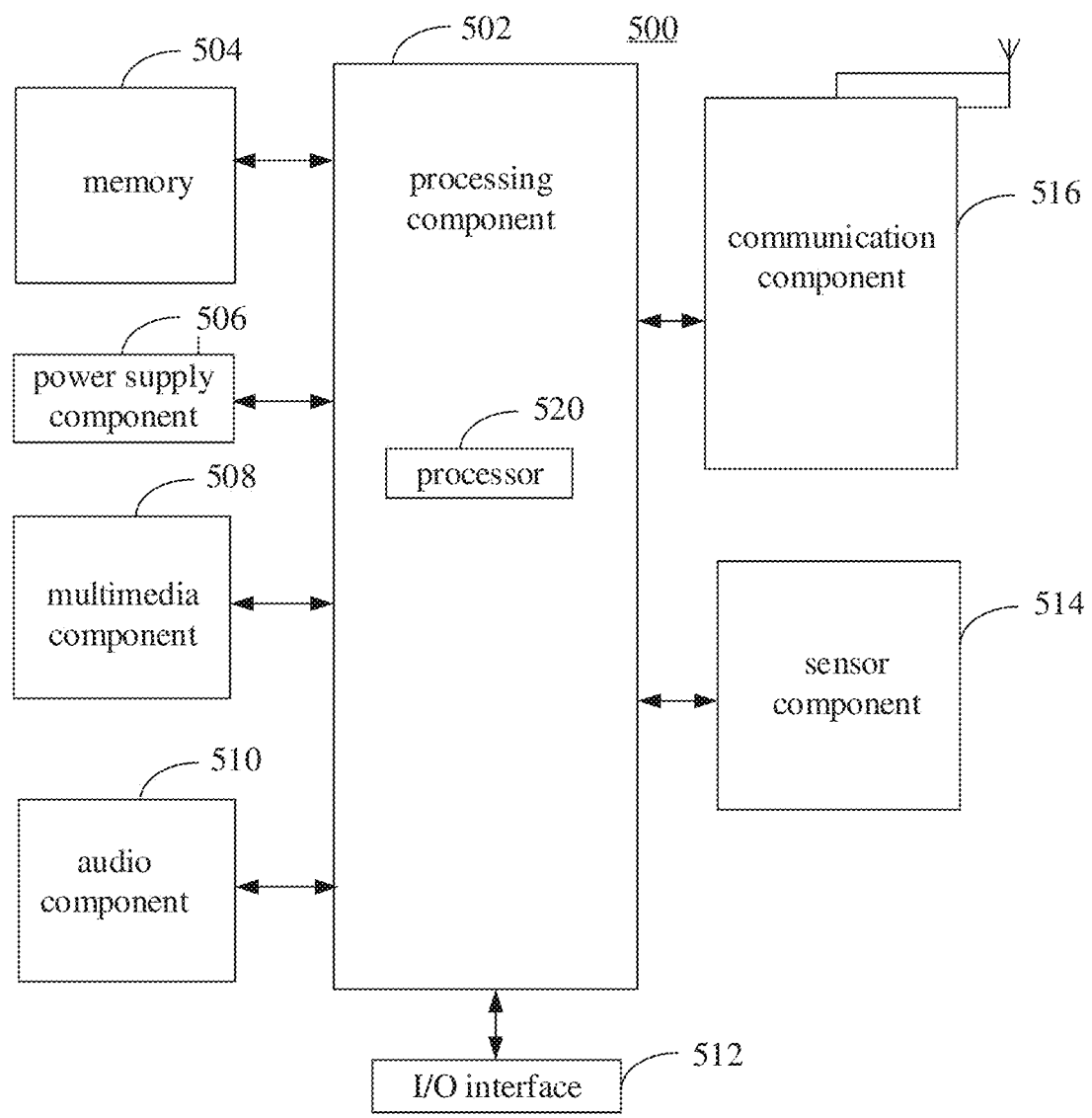
FIG. 11 is a block diagram of a device according to an exemplary embodiment.

FIG. 11 is a block diagram of a device 500 according to an exemplary embodiment. For example, the device 500 may be UE such as a mobile phone, a computer, digital broadcast equipment, messaging equipment, a gaming console, tablet equipment, medical equipment, fitness equipment, a personal digital assistant, etc.

Referring to FIG. 11, the device 500 may include at least one of a processing component 502, memory 504, a power supply component 506, a multimedia component 508, an audio component 510, an Input/Output (I/O) interface 512, a sensor component 514, a communication component 516, etc.

The processing component 502 may generally control an overall operation of the device 500, such as operations associated with display, a telephone call, data communication, a camera operation, a recording operation, etc. The processing component 502 may include one or more processors 520 to execute instructions so as to complete all or a part of an aforementioned method. In addition, the processing component 502 may include one or more modules to facilitate interaction between the processing component 502 and other components. For example, the processing component 502 may include a multimedia portion to facilitate interaction between the multimedia component 508 and the processing component 502.

The memory 504 may be configured to store various types of data to support the operation at the device 500. Examples of such data may include instructions of any application or method configured to operate on the device 500, contact data, phonebook data, messages, pictures, videos, etc. The memory 504 may be realized by any type of transitory or non-transitory storage equipment or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, a compact disk, etc.

The power supply component 506 may supply electric power to various components of the device 500. The power supply component 506 may include a power management system, one or more power sources, and other components related to generating, managing, and distributing electricity for the device 500.

The multimedia component 508 may include a screen that provides an output interface between the device 500 and a user. The screen may include a Liquid Crystal Display (LCD), a Touch Panel (TP), etc. If the screen includes a TP, the screen may be realized as a touch screen to receive a signal input by a user. The TP may include one or more touch sensors for sensing touch, slide, and gestures on the TP The one or more touch sensors not only may sense the boundary of a touch or slide move, but also detect the duration and pressure related to the touch or slide move. The multimedia component 508 may include at least one of a front camera or a rear camera. When the device 500 is in an operation mode such as a photographing mode or a video mode, at least one of the front camera or the rear camera may receive external multimedia data. Each of the front camera or the rear camera may be a fixed optical lens system or may have a focal length and be capable of optical zooming.

The audio component 510 may be configured to output and or input an audio signal. For example, the audio component 510 may include a microphone (MIC). When the device 500 is in an operation mode such as a call mode, a recording mode, a voice recognition mode, etc., the MIC may be configured to receive an external audio signal. The received audio signal may be further stored in the memory 504 or may be sent via the communication component 516. The audio component 510 may further include a loudspeaker configured to output the audio signal.

The I/O interface 512 may provide an interface between the processing component 502 and a peripheral interface portion. Such a peripheral interface portion may be a keypad, a click wheel, a button, etc. Such a button may include but is not limited to at least one of a homepage button, a volume button, a start button, or a lock button.

The sensor component 514 may include one or more sensors for assessing various states of the device 500. For example, the sensor component 514 may detect an on/off state of the device 500 and relative positioning of components such as the display and the keypad of the device 500. The sensor component 514 may further detect a change in the position of the device 500 or of a component of the device 500, whether there is contact between the device 500 and a user, the orientation or acceleration/deceleration of the device 500, a change in the temperature of the device 500, etc. The sensor component 514 may include a proximity sensor configured to detect existence of a nearby object without physical contact. The sensor component 514 may further include an optical sensor such as a Complementary Metal-Oxide-Semiconductor (CMOS) or a Charge-Coupled-Device (CCD) image sensor used in an imaging application. The sensor component 514 may further include an acceleration sensor, a gyroscope sensor, a magnetic sensor, a pressure sensor, a temperature sensor, etc.

The communication component 516 may be configured to facilitate wired or wireless communication between the device 500 and other equipment. The device 500 may access a wireless network based on a communication standard such as Wi-Fi, 4G, 5G . . . , or a combination thereof. The communication component 516 may broadcast related information or receive a broadcast signal from an external broadcast management system via a broadcast channel. The communication component 516 may include a Near Field Communication (NFC) module for short-range communication. For example, the NFC module may be based on technology such as Radio Frequency Identification (RFID), Infrared Data Association (IrDA), Ultra-Wideband (UWB) technology, Bluetooth (BT), etc.

In an exemplary embodiment, the device 500 may be realized by one or more electronic components such as an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, etc., to implement the method.

In an exemplary embodiment, a non-transitory computer-readable storage medium including instructions, such as memory 504 including instructions, may be provided. The instructions may be executed by the processor 520 of the device 500 to implement the methods describe above. For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, etc.

Figure 12:
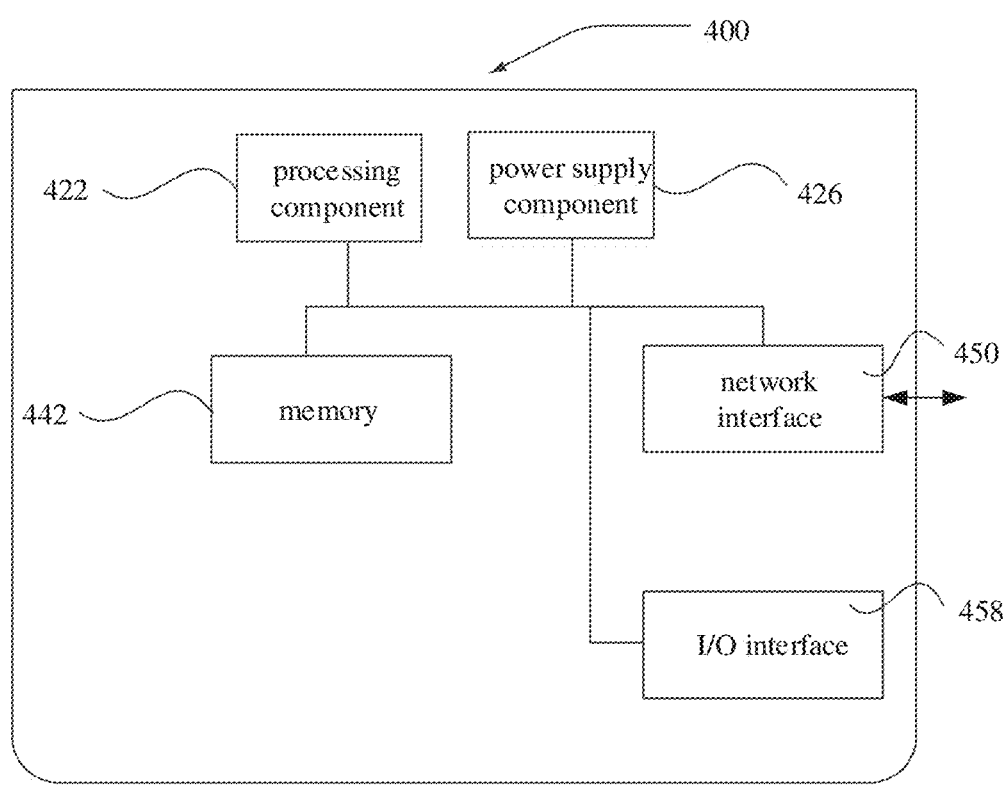
FIG. 12 is a block diagram of a device according to an exemplary embodiment.

FIG. 12 is a block diagram of a device 400 according to an exemplary embodiment. Referring to FIG. 12, the device 400 may be a server or door lock equipment, and may include a processing component 422. The processing component may include one or more processors. The device 400 may include a memory resource represented by memory 442. The memory 442 may store an instruction executable by the processing component 422, such as an APP. The APP stored in the memory 442 may include one or more modules. Each of the modules may correspond to a group of instructions. In addition, the processing component 422 may execute instructions to perform the methods described above.

The device 400 may further include a power supply component 426. The power supply component 426 may be configured to manage power of the device 400. The device 400 may further include a wired or wireless network interface 450 configured to connect the device 400 to a network. The device 400 may further include an Input/Output (I/O) interface 458. The device 400 may operate based on an operating system stored in the memory 442, such as an Android, an iOS, a Windows Server™, a Mac OS X™, a Unix™, a Linux™, a FreeBSD™, etc.

In an embodiment, a non-transitory computer-readable storage medium including instructions, such as the memory 442 including instructions, may be provided. The instructions may be executed by the processing component 422 of the device 400 to perform the methods described above. For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, etc.

Other implementations of the disclosure will be apparent to a person having ordinary skill in the art that has considered the specification and or practiced the present disclosure. The disclosure is intended to cover any variation, use, or adaptation of the disclosure following the general principles of the disclosure and including such departures from the disclosure as come within common knowledge or customary practice in the art. The specification and the embodiments are intended to be exemplary only, with a true scope and spirit of the disclosure being indicated by the appended claims.

The present disclosure is not limited to the exact construction that has been described above and illustrated in the accompanying drawings, and that various modifications and changes can be made to the disclosure without departing from the scope of the disclosure. It is intended that the scope of the disclosure is limited only by the appended claims.

What is claimed is:

1. Door lock equipment, comprising:
a processor; and
a memory storing an instruction executable by the processor,
wherein the processor is configured to:
receive a check-in period and facial characteristics of a user;
during the check-in period, collect a face image of the user and extract facial characteristics from the face image using a neural network model;
authenticate the user in response to the extracted facial characteristics matching the received facial characteristics; and
delete the received facial characteristics in response to determining that the check-in period expires, or in response to an invalidation instruction sent by a server.

2. The door lock equipment of claim 1, wherein the processor is further configured to:
receive the check-in period and the facial characteristics sent by the server,
wherein both the check-in period and the received facial characteristics are acquired by the server based on check-in information of the user.

3. The door lock equipment of claim 1, wherein the processor is further configured to:
receive, based on near field communication (NFC) information, the check-in period and the facial characteristics sent by user equipment (UE) of the user,
wherein the server is configured to determine the NFC information based on check-in information of the user and send the NFC information to the UE.

4. A non-transitory computer-readable storage medium having stored therein instructions that, when executed by a processor of door lock equipment, cause the door lock equipment to perform an authentication method, the authentication method comprising:
receiving a check-in period and facial characteristics of a user;
during the check-in period, collecting a face image of the user and extracting facial characteristics from the face image using a neural network model;
authenticating the user in response to the extracted facial characteristics matching the received facial characteristics; and
deleting the received facial characteristics in response to determining that the check-in period expires, or in response to an invalidation instruction sent by a server.

5. The storage medium of claim 4, wherein receiving the check-in period and the facial characteristics of the user comprises:
receiving the check-in period and the facial characteristics sent by the server,
wherein both the check-in period and the received facial characteristics are acquired by the server based on check-in information of the user.

6. The storage medium of claim 4, wherein receiving the check-in period and the facial characteristics of the user comprises:
receiving, based on near field communication (NFC) information, the check-in period and the facial characteristics sent by user equipment (UE) of the user, wherein the server is configured to determine the NFC information based on check-in information of the user and send the NFC information to the UE.

* * * * *